UNITED STATES PATENT OFFICE.

JOHN ROBERTSON, OF POTTSVILLE, PENNSYLVANIA.

EXTRACT OF MEAT.

SPECIFICATION forming part of Letters Patent No. 283,147, dated August 14, 1883.

Application filed February 8, 1883. (No specimens.)

*To all whom it may concern:*

Be it known that I, JOHN ROBERTSON, a citizen of the United States, residing at Pottsville, in the county of Schuylkill and State of Pennsylvania, have invented certain new and useful Improvements in Tonic Compounds; and I do hereby declare the following to be a full, clear, and exact description of the invention, such as will enable others skilled in the art to which it appertains, to make and use the same.

My invention has relation to tonic compounds, and is both curative and nutritive in its nature. It enables me to supply to the human system, in such proportions as I have found to be the most needful, the gray and white tissues of the brain and nerves, and also the essential elements largely composing the other vital parts of the human body. It is designed to restore these organs when diseased, and to preserve them in a healthy condition.

A valuable part of my invention is the method I employ to extract from the substances containing them the elements deemed essential, and to render the latter both pleasant to the taste and easy to digest and assimilate.

In preparing this remedy I proceed as follows, viz: I take one pound of animal brain and spinal marrow, four ounces of animal-lung tissue, one ounce of animal-heart, two ounces of animal-liver, one ounce of animal-kidney, one ounce of animal-pancreas, and four ounces of animal-stomach. Chop these all very fine together. Place this mixture in a suitable vessel with two gills of water. Then set this vessel with its contents in a larger vessel and surround it with water. I boil this gently for fifteen minutes. Then take out the mixture, and by pressing and straining secure all the nourishing elements of the ingredients in fluid form. I now add two (2) pounds of white sugar to every pint of the fluid thus obtained, dissolving the same by gently heating and constantly stirring it.

Dose: From one (1) to two (2) table-spoonfuls three times a day, immediately after meals.

The organs and glands should be taken from healthy beef-cattle, sheep, hogs, or other domestic animals whose meat is used for food.

I am aware that several of the ingredients of my formula are well known as articles of food, and do not claim novelty in that respect.

I am also aware of a patent, No. 81,190, granted to A. Meyer Berk, for a sirup of extract of beef, and do not claim such as my invention.

What I do claim, and desire to secure by Letters Patent, is—

The herein-described tonic compound, consisting of the combination of animal brain and spinal marrow, lung tissue, heart, liver, kidney, pancreas, stomach, and sugar, in approximately the proportions specified, and prepared substantially as specified.

In testimony whereof I affix my signature in presence of two witnesses.

JOHN ✕ ROBERTSON.
his mark.

Witnesses:
 FRED. F. WADE,
 F. W. MOYER.